(12) United States Patent
VanBlon et al.

(10) Patent No.: US 10,643,362 B2
(45) Date of Patent: May 5, 2020

(54) MESSAGE LOCATION BASED ON LIMB LOCATION

(71) Applicant: LENOVO (Singapore) PTE. LTD., New Tech Park (SG)

(72) Inventors: Russell Speight VanBlon, Raleigh, NC (US); John Carl Mese, Cary, NC (US); Nathan J. Peterson, Oxford, NC (US)

(73) Assignee: Lenovo (Singapore) PTE LTD, New Tech Park (SG)

( * ) Notice: Subject to any disclaimer, the term of this patent is extended or adjusted under 35 U.S.C. 154(b) by 0 days.

(21) Appl. No.: 15/935,546

(22) Filed: Mar. 26, 2018

(65) Prior Publication Data
US 2019/0295298 A1    Sep. 26, 2019

(51) Int. Cl.
| | |
|---|---|
| *G06T 11/60* | (2006.01) |
| *G06F 3/01* | (2006.01) |
| *G06K 9/00* | (2006.01) |
| *G06F 3/0481* | (2013.01) |
| *G06F 3/0484* | (2013.01) |
| *G06F 3/0482* | (2013.01) |
| *G06F 3/03* | (2006.01) |
| *G06T 19/00* | (2011.01) |

(52) U.S. Cl.
CPC .............. *G06T 11/60* (2013.01); *G06F 3/011* (2013.01); *G06F 3/017* (2013.01); *G06F 3/0304* (2013.01); *G06F 3/0481* (2013.01); *G06F 3/0482* (2013.01); *G06F 3/04842* (2013.01); *G06K 9/00375* (2013.01); *G06T 19/006* (2013.01)

(58) Field of Classification Search
CPC ........ G06T 11/60; G06T 19/006; G06F 3/011; G06F 3/0481; G06F 3/017; G06F 3/04842; G06F 3/0482; G06K 9/00375
See application file for complete search history.

(56) References Cited

U.S. PATENT DOCUMENTS

| | | | |
|---|---|---|---|
| 2012/0117514 A1* | 5/2012 | Kim | G06F 3/011 715/849 |
| 2015/0179147 A1 | 6/2015 | Rezaiifar et al. | |
| 2015/0205358 A1* | 7/2015 | Lyren | G06F 3/0484 715/765 |
| 2015/0253862 A1* | 9/2015 | Seo | G06F 3/017 715/863 |
| 2015/0258431 A1* | 9/2015 | Stafford | A63F 13/213 463/31 |

(Continued)

FOREIGN PATENT DOCUMENTS

| | | | |
|---|---|---|---|
| EP | 2889718 A1 * | 7/2015 | .............. G06F 1/16 |
| EP | 2889718 A1 | 7/2015 | |
| EP | 3179292 A1 | 6/2017 | |

*Primary Examiner* — Maurice L. McDowell, Jr.
*Assistant Examiner* — Donna J. Ricks
(74) *Attorney, Agent, or Firm* — Kunzler Bean & Adamson

(57) ABSTRACT

For presenting the message in a location of a display based on a location of a user's limb, methods, apparatus, and systems are disclosed. One apparatus includes a display that presents a first view, a processor, and a memory that stores code executable by the processor. Here, the processor receives a first message to be presented to a user within the first view. The processor determines a location of a limb of the user relative to the first view. Moreover, the processor presents the first message in a location of the first view based on the limb location.

20 Claims, 10 Drawing Sheets

(56) References Cited

U.S. PATENT DOCUMENTS

2016/0109957 A1* 4/2016 Takashima .............. G06F 1/163
　　　　　　　　　　　　　　　　　　　　345/8
2016/0299569 A1* 10/2016 Fisher .................. G02B 27/017
2018/0350150 A1* 12/2018 Powderly .............. G06T 19/006

* cited by examiner

MESSAGE LOCATION BASED ON LIMB LOCATION

FIELD

The subject matter disclosed herein relates to presenting a message on a display and more particularly relates to presenting the message in a location of a display based on a location of a user's limb.

BACKGROUND

When displaying messages in an augmented reality display, prompts may appear to require the user to lift their hands to respond to the message. Overt movement by the user will make it obvious in a social situation that the user is using a digital device. Moreover, messages which require a significant movement to respond to diminish the users experience. While some messages can be responded to using head gestures, eye winks, etc., it becomes difficult to handle more than a couple response options using head/eye movement.

BRIEF SUMMARY

An apparatus for presenting a message in a location of a view based on a location of a user's limb relative to the view is disclosed. A method and computer program product also perform the functions of the apparatus.

One apparatus for presenting a message in a location of a view selected based on a location of a user's limb relative to the view includes: a display that presents a first view, a processor; and a memory that stores code executable by the processor. Here, the processor receives a first message to be presented to a user within the first view and determines a location of a limb of the user relative to the first view. Further, the processor presents, via the display, the first message in a location of the first view based on the limb location.

In certain embodiments, the processor presents the first message in a first location, in response to the limb of the user being within the first view. Here, the first location may be a predetermined distance of the limb. In other embodiments, the processor presents the first message in a second location, in response to the limb of the user not being within the first view. Here, the second location may be based on one of a last known limb location and an expected limb location.

In some embodiments, the first view is an augmented reality view. In one embodiment, the limb is a preferred hand of the user. In various embodiments, the apparatus further including a camera that captures image data corresponding to the first view. In such embodiments, the processor determines whether the preferred hand of the user is within the first view using the captured image data. In further embodiments, the second location is near a non-preferred hand of the user.

In certain embodiments, the processor presents image data corresponding to the first view on the display. In such embodiments, the processor presents the first message along a periphery of the first view in response to the limb of the user not being within the first view. In various embodiments, the first message includes one or more selection elements. Here, the selection elements may be one or more of: an acknowledgement element, a reply button, a send button, and a virtual keyboard.

In some embodiments, the processor determines whether the apparatus is operating in a stealth mode. In such embodiments, determining the location of a limb of the user relative to the first view occurs in response to determining that the apparatus is operating in a stealth mode. Moreover, the processor may present the first message in a central area of the first view in response to determining that the apparatus is not operating in a stealth mode. In certain embodiments, the processor identifies a surface near the limb location. Here, presenting the first message includes overlaying the first message on the identified surface.

One method for presenting a message in a location of a view selected based on a location of a user's limb relative to the view includes receiving, by use of a processor, a first message to be presented to a user via a display, the display showing a first view. The method includes determining a location of a limb of the user relative to the first view, the first view being one of a virtual reality view and an augmented reality view. The method includes displaying the first message in a location of the first view based on the limb location.

In some embodiments, the method includes determining whether a limb of the user is within the first view. In one embodiment, the method includes displaying the first message in a first location in response to the limb of the user being within the first view. In another embodiment, the method includes displaying the first message in a second location in response to the limb of the user not being within the first view. In various embodiments, the first location is within a predetermined distance of the limb, and the second location is based on a last known limb location and/or an expected limb location.

In certain embodiments, the first view is an augmented reality view. In certain embodiments, the limb is a dominant hand of the user. In some embodiments, the method may include capturing image data corresponding to the first view. In such embodiments, determining whether a limb of the user is within the first view may include determining whether the dominant hand is within the captured image data. Moreover, the second location may be a location near a non-dominant hand of the user.

In some embodiments, the method includes displaying image data corresponding to the first view on the display. In such embodiments, displaying the first message in the location of the first view based on the limb location may include displaying the first message along a periphery of the display in response to the limb of the user not being within the first view. In various embodiments, the first message includes one or more selection elements, said selection elements including one or more of: an acknowledgement element, a reply button, a send button, and a virtual keyboard.

In some embodiments, the method includes determining whether the display is operating in a stealth mode. In such embodiments, determining the location of a limb of the user relative to the first view occurs in response to determining that the display is operating in a stealth mode. Moreover, the method may include displaying the first message in a central area of the display in response to determining that the display is not operating in a stealth mode. In some embodiments, the method includes identifying a surface near the limb location, wherein presenting the first message includes overlaying the first message on the identified surface.

One computer program product for presenting a message in a location of a view selected based on a location of a user's limb relative to the view includes a computer readable storage medium that stores code executable by a processor. Here, the executable code includes code that: receives a first message to be presented to a user via an augmented reality display, the augmented reality display showing a first view, determines whether a limb of the user is within the first view, displays the first message in a first location of the augmented reality display in response to the limb of the user being within the first view, the first location based on a limb location, and displays a message indication in a second location of the augmented reality display in response to the limb of the user not being within the first view.

In some embodiments, the code also identifies a limb location in response to the limb of the user being within the first view. In such embodiments, displaying the first message in a first location of the augmented reality display based on the limb location includes identifying a surface near the limb location and displaying the first message on the identified surface. In some embodiments, the second location is along a periphery of the augmented reality display. In some embodiments, the first message includes one or more of: an acknowledgement element, a reply button, a send button, and a virtual keyboard.

In certain embodiments, the second location is based on a last known limb location. In certain embodiments, the code also determines that the limb is within the first view after displaying the message indication, identifies a current limb location in response to the limb of the user being within the first view, and displays the first message in a location of the augmented reality display based on the current limb location.

One program product for presenting a message in a location of a view based on a location of a user's limb relative to the view includes a computer readable storage medium that stores code executable by a processor. In one embodiment, the computer readable storage medium does not include transitory signals. Moreover, the executable code may include code that: receives a first message to be presented to a user via an augmented reality display, determines whether a limb of the user is within a view of the augmented reality display, displays the first message in a first location of the display in response to the limb of the user being within the first view, the first location based on a limb location, and displays a message indication in a second location of the augmented reality display in response to the limb of the user not being within the view of the augmented reality display.

In some embodiments, the program product includes code that identifies a limb location in response to the limb of the user being within the view of the augmented reality display. In such embodiments, displaying the first message in a first location of the augmented reality display based on the limb location may include identifying a surface near the limb location and displaying the first message on the identified surface. In certain embodiments, the second location is along a periphery of the augmented reality display, wherein the first message comprises one or more of: an acknowledgement element, a reply button, a send button, and a virtual keyboard.

In certain embodiments, the second location is based on a last known limb location. In some embodiments, the program product includes code that determines that the limb is within the first view after displaying the message indication, identifies a current limb location in response to the limb of the user being within the first view, and displays the first message in a location of the display based on the current limb location.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
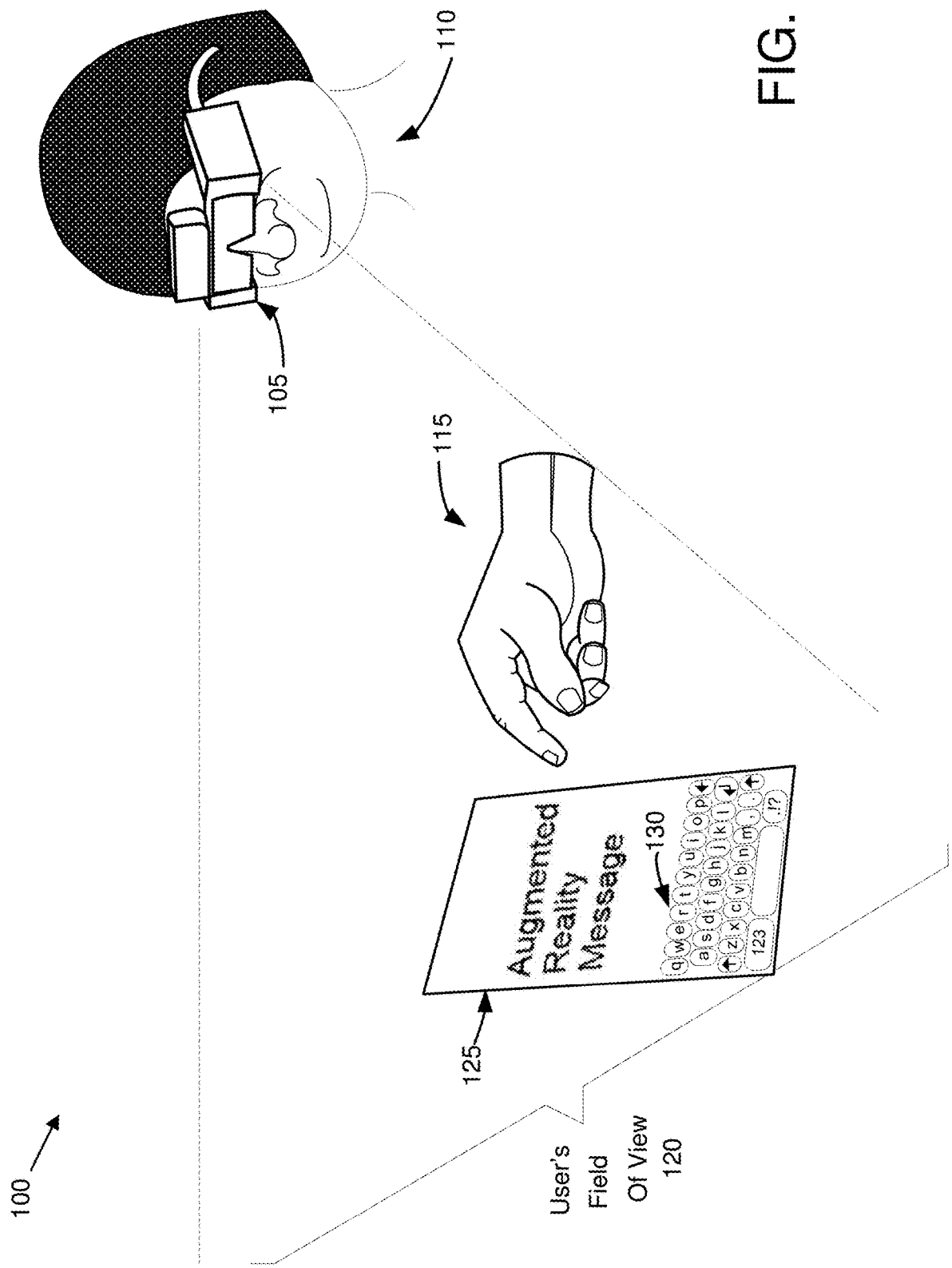
FIG. 1 is a schematic block diagram illustrating one embodiment of a system for presenting a message in a location of a view selected based on a location of a user's limb relative to the view.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices are tangible, non-transitory, and/or non-transmission. The storage devices do not embody signals. In a certain embodiment, the storage devices may employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

For presenting a message in a location of a view based on a location of a user's limb relative to the view, methods, systems, and apparatuses are disclosed herein. In a world of augmented reality ("AR") messages, prompts may appear that require the user to lift their hands to respond to a message (e.g., make a hand gesture into 3D space). The user may not want messages to require a lot of movement to respond to. For example, lots of movement may make it obvious in social situations of the user using a digital device. While some messages can be responded via head gestures, eye winks, etc., this gets difficult for much more than a couple response options. In various embodiments, the message may include multiple selection elements, such as buttons for Yes/No, Send/Reply, or even a full qwerty keyboard for inputting text.

The present disclosure solves the above problems by presenting messages in a point-of-view ("POV") display, such as a AR display or virtual reality ("VR") display, at a location where they are most easily responded to by the user. In one embodiment, this includes identifying the location of the user's limbs (e.g. hands) and placing a message proximate to their hand. This requires the user to move their hand(s) as little as possible in order to respond to a message. One example is placing a notification with a "Yes/No" dialog box near the user's hand.

In another embodiment, this includes identifying a surface that is nearby the user's hand. The surface may be the user's pants, leg, nearby table, back of one hand, stomach, etc. If the display device hardware/software supports "surface detection," then the message may be laid onto a surface for consumption and/or quick response.

In various embodiments, the user may specify whether messages should go to their left or right hand. If the user's desired limb is out of view, the POV display may indicate a message is off-screen. Alternatively, the POV display may show the message in the corner, and move the message to the user's limb as they pan their head, move their eyes, etc.

Beneficially, the disclosed solutions make it so that the user doesn't have to "reach" very far to respond to a message, thus making it easy to respond to a message/notification. Additionally, the disclosed solutions make it so that nearby people are less likely to be aware the user is responding to a message (e.g., employing an AR incognito mode).

FIG. 1 depicts a system 100 for presenting a message in a location of a view selected based on a location of a user's limb relative to the view, according to embodiments of the disclosure. The system 100 includes an electronic device 105 for presenting a point-of-view display to a user 110. In one embodiment, the point-of-view display is an augmented reality display. In another embodiment, the point-of-view display is a virtual reality display. The point-of-view display presents images corresponding to the user's field of view 120. Using a limb 115 (here, a hand is depicted), the user 110 is able to interact with objects (real or virtual), including objects located in the user's field of view 120.

Upon receiving an alert, notification, or other message, the electronic device 105 may present the message as a virtual object 125 within the user's field of view. Where the point-of-view ("POV") display shows a virtual reality, the virtual object 125 may be an object within the virtual world. Where the POV shows a virtual reality, the virtual object 125 may be a computer-generated image superimposed on a user's view of the real world. Moreover, the user 110 uses the limb 115 to interact with the virtual object 125, for example to acknowledge/dismiss the message, respond to a prompt, compose a response, etc.

A POV message controller (not shown) controls the presentation of the virtual object 125 corresponding to the received notice, alert, prompt, message, etc., collectively referred to herein as a "first message." The POV message controller is a part of the electronic device 105. In various embodiments, the POV message controller comprises computer hardware, computer software, and combinations thereof. The POV message controller interacts with one or more POV display elements of the electronic device 105 to present the virtual object 125 within the user's field of view. In one embodiment, the presented virtual object 125 includes the received message/notification. In another embodiment, the presented virtual object 125 is a message indicator that informs the user 110 of the received message/notification. In various embodiments, the virtual object 125 includes one or more selectable (e.g., interactive) elements, such as button for yes/no, to reply to a text message, to send a response, to dismiss a notification, etc.

The POV message controller of the electronic device 105 selectively presents the first message in a location of the display, according to the principles described herein. In some embodiments, the POV message controller receives the first message to be presented to the user, for example from an application running on the electronic device 105, an operating system running on the electronic device 105, a messaging client running on the electronic device 105, etc. The POV message controller also determines to present the virtual object 125 corresponding to the received message.

Upon receiving the first message (and determining to present the virtual object 125 corresponding to the received message), the electronic device 105 determines a location of the limb 115 relative to the field of view 120. In one embodiment, the electronic device 105 determines that the limb 115 is present within the field of view 120. Moreover, the electronic device 105 may identify a specific location within the field of view 120 corresponding to the limb 115.

In another embodiment, the electronic device 105 determines that the limb 115 is outside the field of view 120.

In certain embodiments, the electronic device 105 (or POV message controller) determines the location of the limb 115 relative to the field of view 120 by capturing image data corresponding to the user's field of view 120 (e.g., using a camera integrated with the electronic device 105 and pointing towards the field of view 120) and analyzing said image data for the limb location. In other embodiments, the user 110 may wear a tracking device or location device on the limb 115 and the electronic device 105 (or POV message controller) determines the location of the limb 115 relative to the field of view 120 using data from the tracking device or location device. For example, the user may wear a wristband having an inertial measurement unit ("IMU") containing a combination of sensors used to determine the location on the limb 115.

Moreover, the electronic device 105 (or POV message controller) presents the virtual object 125 corresponding to the first message in a location based on the determined location of the limb 115. In some embodiment, the electronic device 105 (or POV message controller) displays the virtual object 125 in a first location when the limb 115 is within the field of view 120 and displays the virtual object 125 in a second location when the limb 115 is outside the field of view 120. In one example, the first location is a predetermined distance from the location of the limb 115. In another example, the second location is along a periphery of the field of view 120. The second location may be based on a last known location of the limb 115 and/or an expected location of the limb 115.

In various embodiments, the limb 115 is a preferred limb of the user 110. The electronic device 105 may store preference information for the user 110, said preference information indicating a specific limb 115 (e.g., hand) as the preferred limb (e.g., hand). Accordingly, the electronic device 105 may determine the location of the preferred limb relative to the user's field of view 120 and display the virtual object 125 at a location based on the location of the preferred limb. In certain embodiments, the electronic device 105 displays the virtual object 125 near a non-preferred limb if the preferred limb in not present within the user's field of view 120.

The electronic device 105 includes a POV display, such as an augmented reality display or a virtual reality display. While depicted as a wearable device (specifically a head-mounted display), in other embodiments the electronic device 105 is a handheld device. Moreover, electronic device 105 may be a distributed device having the POV display separate from the rest of the electronic device 105. For example, the POV display may be a wearable display device while the rest of the electronic device 105 may be a computer device in communication with the wearable display. Examples of computer devices include, but are not limited to, a laptop computer, a desktop computer, a tablet computer, a smartphone, a gaming console, and the like.

In certain embodiments, the electronic device 105 has a plurality of operating modes, including a normal mode and an incognito mode (also referred to herein as a "stealth" mode). In various embodiments, the electronic device 105 places the virtual object 125 near the limb 115 while in the incognito mode to minimize movement of the limb 115 when responding to the virtual object 125. Beneficially, placing the virtual object 125 near the limb 115 reduces the likelihood of the user 110 attracting the attention of nearby individuals when responding to the first message. In certain embodiments, the electronic device 105 places the virtual object 125 at a center area within the field of view 120 while in the normal mode. In other embodiments, the electronic device 105 still places the virtual object 125 at a position based on the location of the limb 115 while in the normal mode.

Figure 2:
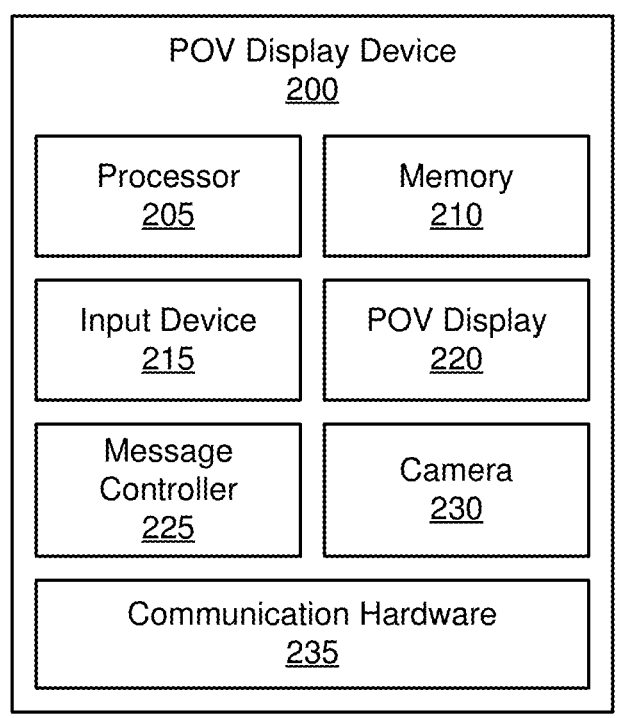
FIG. 2 is a schematic block diagram illustrating one embodiment of an apparatus for presenting a message in a location of a view selected based on a location of a user's limb relative to the view.

FIG. 2 depicts an apparatus for presenting a message in a location of a view selected based on a location of a user's limb relative to the view, according to embodiments of the disclosure. In the depicted example, the apparatus is embodied as an POV display device 200. The POV display device 200 may be one embodiment of the electronic device 105, discussed above. The POV display device 200 may include a processor 205, a memory 210, and a POV display 220.

In various embodiments, the POV display device 200 may optionally include an input device 215, a camera 230, and/or communication hardware 235. The POV display device 200 may include a body or an enclosure, with the components of the POV display device 200 being located within the enclosure. Moreover, the components of the POV display device 200 are communicatively coupled to each other, for example via a computer bus.

The processor 205, in one embodiment, may comprise any known controller capable of executing computer-readable instructions and/or capable of performing logical operations. For example, the processor 205 may be a microcontroller, a microprocessor, a central processing unit (CPU), a graphics processing unit (GPU), an auxiliary processing unit, a FPGA, or similar programmable controller. In some embodiments, the processor 205 executes instructions stored in the memory 210 to perform the methods and routines described herein. The processor 205 is communicatively coupled to the memory 210, the input device 215, the POV display 220, the message controller 225, the camera 230, and the communication hardware 235. In certain embodiments, the processor 205 may perform the methods described herein.

The memory 210, in one embodiment, is a computer readable storage medium. In some embodiments, the memory 210 includes volatile computer storage media. For example, the memory 210 may include a random-access memory (RAM), including dynamic RAM (DRAM), synchronous dynamic RAM (SDRAM), and/or static RAM (SRAM). In some embodiments, the memory 210 includes non-volatile computer storage media. For example, the memory 210 may include a hard disk drive, a flash memory, or any other suitable non-volatile computer storage device. In some embodiments, the memory 210 includes both volatile and non-volatile computer storage media.

In some embodiments, the memory 210 stores data relating to presenting a message in a location of a view selected based on a location of a user's limb relative to the view. For example, the memory 210 may store limb locations, hand preferences, message locations, message context, operating modes, and the like. In one embodiment, the memory 210 includes a set of registers storing the data discussed below with reference to FIG. 3B. In some embodiments, the memory 210 also stores program code and related data, such as an operating system operating on the POV display device 200. In one embodiment, the message controller 225 may be embodied in a software application (or set of software applications) stored in the memory 210 and operating on the POV display device 200.

The input device 215, in one embodiment, may comprise any known computer input device including a touch panel, a button, a keyboard, a microphone, a camera, and the like. For example, the input device 215 may include a microphone or similar audio input device with which a user (e.g., the user 110) inputs sound or voice data (e.g., voice commands). In some embodiments, the input device 215 (or portion thereof) may be integrated with the POV display 220, for example, as a touchscreen or similar touch-sensitive display. In some embodiments, the input device 215 comprises two or more different devices, such as a microphone and a touch panel.

The POV display 220, in one embodiment, is configured to output image data corresponding to a first message. In one embodiment, the POV display 220 is an augmented reality display which overlays messages or notifications, such as the first message, on images corresponding to the real world. In another embodiment, the POV display 220 is a virtual reality display which presents a virtual world and further presents messages or notifications, such as the first message, within the virtual world.

In one embodiment, the POV display 220 projects one or more images on a transparent surface (e.g., glass) to create an augmented reality display. Exemplary AR projectors include heads-up displays, smart-glasses, and the like. In another embodiment, the POV display 220 projects one or more images directly onto the retina of the user 110 to create an augmented reality display. In certain embodiments, the POV display 220 is a wearable (or handheld) electronic display that presents (e.g., live) camera data corresponding to the user's field of view and superimposes images on the camera data to create an augmented reality display. In other embodiments, the POV display 220 is a virtual reality ("VR") display, such as a VR headset, VR goggles, VR glasses, and the like.

In some embodiments, all or portions of the POV display 220 may be integrated with the input device 215. For example, the input device 215 and POV display 220 may form a touchscreen or similar touch-sensitive display. In other embodiments, the POV display 220 may be located near the input device 215. The POV display 220 may receive instructions and/or data for output from the processor 205 and/or the message controller 225. Moreover, the POV display 220 may be integrated with the camera 230.

In some embodiments, the POV display device 200 includes additional output devices, for example outputting audio and/or haptic signals. In certain embodiments, these additional output devices are integrated with, or located adjacent to, the POV display 220. In some embodiments, the POV display device 200 includes one or more speakers for producing sound, such as an audible alert or notification. In some embodiments, the POV display device 200 includes one or more haptic devices for producing vibrations, motion, or other haptic output. In certain embodiments, the POV display device 200 may include an additional electronic display, such as LCD display, an LED display, an OLED display, a projector, or similar display device capable of outputting images, text, or the like to a user.

The message controller 225, in one embodiment, is configured to receive a first message to be presented to a user (e.g., the user 110) within a first view (e.g., presented via the virtual object 125), determine a location of a limb of the user (e.g., the limb 115) relative to the first view, and present the first message in a location of the display based on the limb location. Here, the POV display 220 presents the first view to the user. In various embodiments, the first view corresponds to the field of view 120 of the user 110.

In some embodiments, the message controller 225 presents the first message in a first location in response to the limb of the user being within the first view and presents the first message in a second location in response to the limb of the user not being within the first view. In certain embodiments, the first location is within a predetermined distance of the limb. In certain embodiments, the second location is based on one of a last known limb location and an expected limb location.

In certain embodiments, the first view is an augmented reality view and the limb is a preferred hand of the user. In some embodiments, the message controller 225 determines whether the preferred hand of the user is within the augmented reality view using image data captured by the camera 230, the image data corresponding to the first view. In one embodiment, the second location is near a non-preferred hand of the user.

In certain embodiments, the message controller 225 presents image data corresponding to the first view on the display, and further presents the first message along a periphery of the display in response to the limb of the user not being within the first view. Here, the periphery of the display coincides with the periphery of the first view. In various embodiments, the first message comprises one or more selection elements, such as an acknowledgement element, a reply button, a send button, a virtual keyboard, and the like.

In some embodiments, the message controller 225 determines whether the POV display device 200 is operating in a stealth mode. Here, the message controller 225 may then determine a location of the user's limb of the user relative to the first view in response to determining that the POV display device 200 is operating in a stealth mode. Otherwise, the message controller 225 may present the first message in a central area of the POV display 220 in response to determining that the POV display device 200 is not operating in a stealth mode. In various embodiments, the message controller 225 identifies a surface near the limb location. In such embodiments, presenting the first message comprises the message controller 225 overlaying the first message on the identified surface.

The camera 230, in one embodiment, is configured to capture image data corresponding to a user's field of view (e.g., the first view). Here, the camera 230 faces the same direction as the user's eyes. The image data captured by the camera 230 may be used to determine the location of the user's limb relative to the field of view.

In various embodiments, the camera 230 may include a plurality of camera devices. For example, a pair of camera devices may be used to capture stereoscopic image data corresponding to the user's field of view. As another example, a camera device may face the user to track eye movement, to track limb locations outside the user's field of view, etc.

The communication hardware 235 may support wired or wireless communication between the POV display device 200 and another device or network. The wireless connection may include a mobile telephone network. The wireless connection may also employ a Wi-Fi network based on any one of the Institute of Electrical and Electronics Engineers (IEEE) 802.11 standards. Alternatively, the wireless connection may be a BLUETOOTH® connection. In addition, the wireless connection may employ a Radio Frequency Identification (RFID) communication including RFID standards established by the International Organization for Standardization (ISO), the International Electrotechnical Commission (IEC), the American Society for Testing and Materials® (ASTM®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification (IrPHY) as defined by the Infrared Data Association® (IrDA®). Alternatively, the wireless connection may be a cellular telephone network communication. All standards and/or connection types include the latest version and revision of the standard and/or connection type as of the filing date of this application.

Figure 3A:
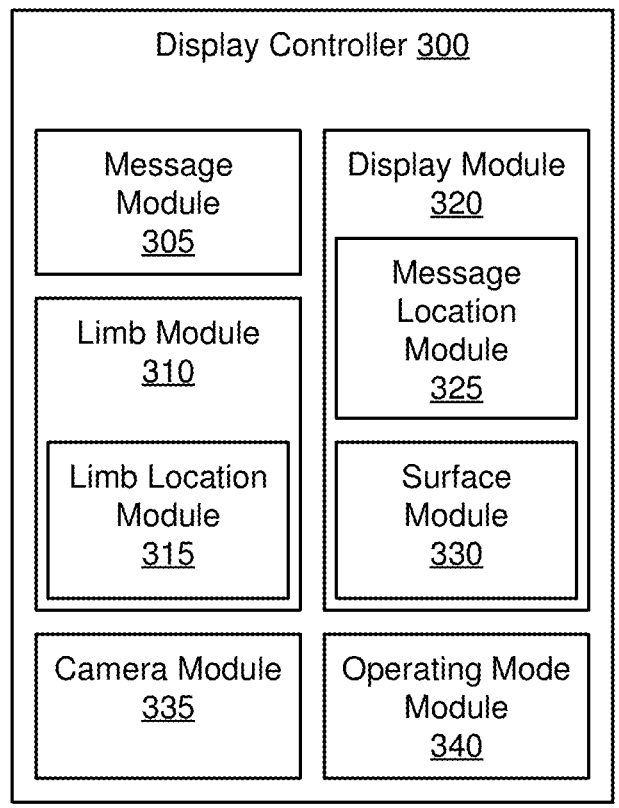
FIG. 3A is a schematic block diagram illustrating one embodiment of a display controller for a message in a location of a view selected based on a location of a user's limb relative to the view.

FIG. 3A depicts a display controller 300, according to embodiments of the disclosure. Here, the display controller 300 may be a POV message controller for presenting a message in a location of a view selected based on a location of a user's limb relative to the view. Moreover, the display controller 300 may be one embodiment of the message controller 225, described above. In the depicted embodiment, the display controller 300 includes a plurality of modules, including a message module 305, a limb module 310, a limb location module 315, a display module 320, a message location module 325, a surface module 330, a camera module 335, and an operating mode module 340. As described above, the modules 305-340 may be implemented as a hardware circuit, a programmable hardware device, or software for execution by various types of processors.

The message module 305, in one embodiment, is configured to receive a first message to be presented to a user (e.g., within the augmented reality view). The first message may be received from an external correspondent (e.g., a text message from a friend) and/or may be a system notification. In certain embodiments, the first message comprises one or more selection elements. Examples of selection elements include, but are not limited to, an acknowledgement element, a reply button, a send button, a virtual keyboard, and the like.

The limb module 310, in one embodiment, is configured to determine whether a limb 115 of the user 110 is within the augmented reality view. In other embodiments, the limb is a hand of the user. In a further embodiment, the limb is a dominant hand or a preferred hand. Here, a user-controlled setting may specify which hand is the dominant or preferred hand. Alternatively, the limb module 310 may predict which hand is the dominant/preferred hand based on observations of which hand the user typically used when responding to a message or to a notification on the POV display 220. Thus, historical data may be used to empirically determine the user's preferred hand for responding to a message/notification, such as the first message. Where a preferred limb/hand is known, the limb module 310 may then determine whether the preferred limb/hand is within the user's view (e.g., the first view).

As used herein, the "user's view" refers to the view perceived by the user when looking at the POV display 220. As described above, the user's view may correspond to a field of view, such that the content presented on the POV display 220 changes as the user moves (e.g., in response to head movement, eye movement, body movement, etc.). In one embodiment, the POV display 220 comprises an augmented reality image that is superimposed on a transparent surface through which "reality" is seen, such as a heads-up display. In another embodiment, the POV display 220 is a non-transparent electronic display where image data of "reality" (e.g., as captured via camera), or a virtual reality, is displayed with one or more overlay images being superimposed on the image data (e.g., overlay to top the "reality").

The limb location module 315, in one embodiment, is configured to identify a location of the limb with respect to the user's view. In one embodiment, the limb location is a set of spatial coordinates within the user's view. In another embodiment, the limb location may be determined as "out-of-view." In further embodiments, a limb that is not within the user's view may be associated with a last-known-limb location. In certain embodiments, a flag is associated with the limb location, such that, when set, the flag indicates that the limb is within the user's view and the limb location is a current location of the limb. Moreover, when the flag is not set, it indicates that the limb is not within the user's view and the limb location is a last-known-location of the limb. While depicted as a component of the limb module 310, in other embodiments the limb location module 315 may be a separate and independent module of the display controller 300.

The display module 320, in one embodiment, is configured to present the first message at a location of the POV display 220 based on the limb location. In some embodiments, the display module 320 presents a message indicator within the POV display 220, for example whenever the user's limb is not within the user's view. Here, the first message and message indicator may be embodiments of the virtual object 125 described above. In one embodiment, the display module 320 sends image data to the POV display 220 for presentation of the first message. In another embodiment, the display module 320 itself generates frame data and controls the display element(s) of the POV display 220 to present the first message.

In certain embodiments, the first message comprises one or more selection elements to be selected via the user's limb (e.g., hand). Here, the user may use the limb to gesture in space in order to interact with the selection element(s). The selection elements may include, but are not limited to, an acknowledgement element, a reply button, a send button, a yes button, a no button, a dismiss button, a virtual keyboard, and the like. Note here that the selection elements present depend on the nature of the first message. Simple modifications may require only an acknowledgment element or yes/no buttons, while an email or text message may require additional elements, such as a send/reply button or even a full QWERTY keyboard for inputting text.

In various embodiments, the user's limb (e.g., preferred limb/hand) is present within the user's view. Here, the display module 320 presents the first message at a first location within the POV display 220. Generally, the first location is based on the location of the user's limb. Determination of the first location is discussed further details below.

In other embodiments, the user's (e.g., preferred) limb is not present within the user's view. Here, the display module 320 presents the first message (or alternatively a message indicator) within the POV display 220 at a second location of the user's view. In various embodiments, the second location may be based on a last known limb location, and expected them location, a location of a non-preferred hand, and/or along the periphery of the POV display 220. In certain embodiments, the periphery of the POV display 220 coincides with the periphery of the user's view.

Here, the message indicator is a notification that notifies the user of the received message. Note, however, that the message indicator is not the first message. For example, the message indicator may be an icon, a dot, or other image that indicates a pending message. In contrast, the first message may include text, pictographs, and the like and may include one or more selection elements (e.g., to acknowledge the message). In certain embodiments, the message indicator is displayed at the periphery of the POV display 220, for example near an expected limb location or a last known limb location. Here, as the user turns towards the message indicator the (preferred) limb may appear within the user's view. Alternatively, the user may move the (preferred) limb into the user's view in response to noticing the message indicator. In response to the limb appearing within the user's view, the display module 320 may then remove the message indicator and present the first message at a first location based on the and location.

The message location module 325, in one embodiment, is configured to calculate the first location and second location. As noted above, the first location may be based on a limb location, such as the location of the user's preferred hand or a location of the index finger of the user's preferred hand. In some embodiments, the first location is no more than a predetermined distance away from the user's preferred hand. This predetermined distance may be a set number of pixels on the display from the hand location, a fixed distance in the real/virtual world (e.g., 3 cm from the index finger of the user's preferred hand), an angular distance (e.g., to take into account the user's perspective), and the like. In one embodiment, the first location is a fixed distance above the user's preferred hand. In another embodiment, the first location is a fixed distance to the side of the user's preferred hand. For example, where the user's preferred hand is a left-hand, the first location may be a fixed distance to the left of the user's left-hand. In various embodiments, the second location may be based on a last known limb location, and expected them location, a location of a non-preferred hand, and/or along the periphery of the POV display 220. While depicted as a component of the display module 320, in other embodiments the message location module 325 may be a separate and independent module of the display controller 300.

The surface module 330, in one embodiment, is configured to identify a surface near the limb location. The surface module 330 additionally indicates parameters of the surface to the display module 320, such as location, surface dimensions, plane orientation, and the like. Here, the display module 320 may then present the first message on the identified surface. Examples of identifiable surfaces near a user's limb include, but are not limited to, a desk, a dashboard, a table, a chair arm, a pant leg, a sleeve, the back of her hand, an arm, and the like.

The surface module 330 may employ various known algorithms for identifying a surface from the image data (e.g., camera data) corresponding to the user's point-of-view. In certain embodiments, the surface module 330 may estimate a size of the first message and verify that the identified surface is large enough for displaying the first message. If the surface is large enough for display in the first message, then the surface module 330 may then indicate surface parameters corresponding to the identified surface to the display module 320. Otherwise, if the surface is not large enough, the surface module 330 may search for another suitable surface. If no suitable surface can be found, the surface module 330 may indicate to the display module 320 that no surface is available within the user's point-of-view. While depicted as a component of the display module 320, in other embodiments the surface module 330 may be a separate and independent module of the display controller 300.

The camera module 335, in one embodiment, is configured to capture image data corresponding to the user's view. Where the POV display 220 is an augmented reality view, the camera module 335 may capture image data corresponding to real-world objects, persons, and/or scenery in front of the user. Where the POV display 220 is a virtual reality view, the image data may correspond to the virtual world in front of the user. Moreover, the camera module 335 may coordinate with the limb module 310 to determine whether the limb of the user is with the user's view (e.g., augmented reality view or virtual reality view). For example, the camera module 335 may use various image recognition techniques to determine whether one or more of the user's limbs are within captured data corresponding to an augmented reality view. In another example, the camera module 335 may track an object in the virtual world corresponding to the user's limbs/hands. In certain embodiments, the camera module 335 identifies a limb present within the user's view, such as a left hand, right hand, preferred hand, etc.

The operating mode module 340, in one embodiment, is configured to determine whether the display controller 300 is operating in a stealth mode. As used herein, a stealth mode refers to a mode where the user's use of an augmented reality device is made minimally detectable to an observer. While in the stealth mode, also referred to as an AR "incognito" mode, messages, prompts, and other notifications are to be placed near a user's hand so that minimal movement is needed to respond to the message/notification. In certain embodiments, the display module 320 presents the first message at the first location (e.g., a location near the limb within the user's view) when the display controller 300 is operating in the stealth mode, and otherwise presents the first message in a central area of the POV display 220 (in response to determining that the display controller 300 is not operating in a stealth mode).

Figure 3B:
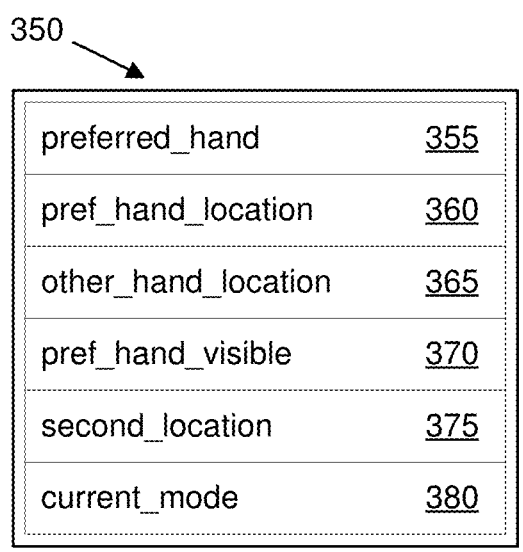
FIG. 3B is a block diagram illustrating one embodiment of a data structure for presenting a message in a location of a view selected based on a location of a user's limb relative to the view.

FIG. 3B depicts an exemplary data structure 350 storing parameters for presenting a message in a location of a view selected based on a location of a user's limb relative to the view. As depicted, the data structure 350 contains a plurality of fields. In one embodiment, each field is stored in a register, for example of a message controller 225 or a display controller 300. In another embodiment, the data structure 350 is stored in the memory 210. The data structure 350 stores data used in presenting a message in a location of a view selected based on a location of a user's limb relative to the view.

The data structure 350 may include one or more of: a field 355 storing an indicator of a preferred hand for placement of messages and notifications ("preferred_hand"), a field 360 storing a limb location for the preferred hand ("pref_hand_location"), a field 365 storing a limb location for the non-preferred hand ("other_hand_location"), a field 370 indicating whether the preferred hand is within the augmented reality view ("pref_hand_visible"), a field 375 storing a second location limb location for the preferred hand, such as when the preferred hand is not visible within the augmented reality view ("second_location"), and a field 380 indicating whether the AR display is operating in a "stealth" or "incognito" mode ("current_mode"). In further embodiments, additional data may be stored in the data structure 350, including whether the message/notification is to be displayed on a surface (e.g., rather than in a floating window), a hand-reach distance, or the like.

Figure 4A:
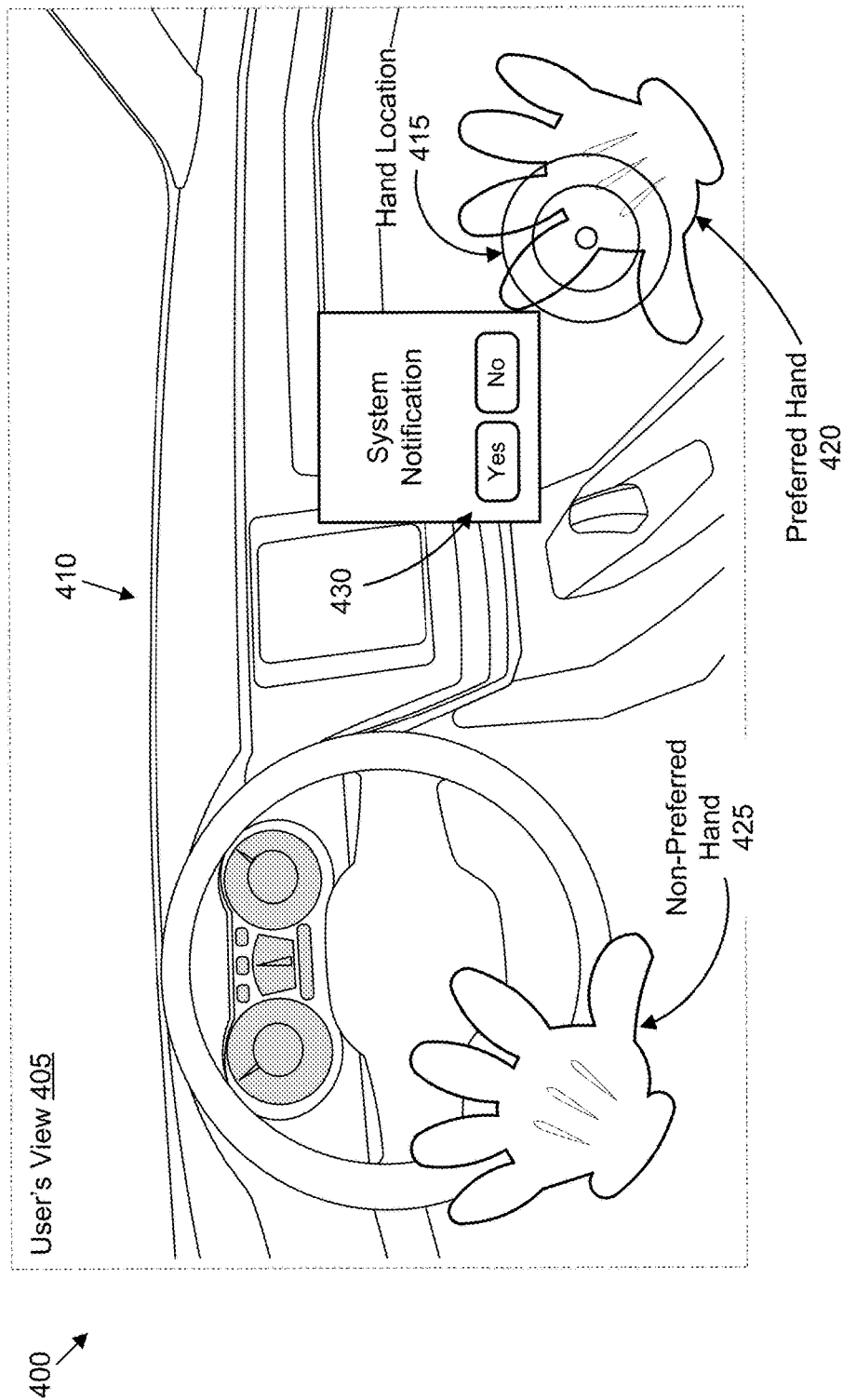
FIG. 4A is a diagram illustrating one embodiment of displaying a message at a first location.

FIG. 4A depicts one scenario 400 of displaying a message at a first location, according to embodiments of the disclosure. FIG. 4A depicts a user's view 405, which may be one embodiment of the user's field of view 120. Here, the user's view 405 is from a driver's seat of a vehicle. Moreover, the user's view 405 includes one or more objects and/or scenes, such as a vehicle interior 410. In one embodiment, the objects/scenes are a part of the real world, for example as viewed through an augmented reality display. In another embodiment, the objects/scenes are virtual, for example, computer-generated images in the augmented reality display or objects of a virtual world viewed through a virtual reality display. A POV message controller (e.g., embodied in the electronic device 105, the POV display device 200, the message controller 225, and/or the display controller 300, described above) receives a notification, text message, or the like and determines to present a first message 430 within the user's view 405.

In response to determining to present the first message 430, the POV message controller determines a message location for placing the first message 430 by determining a location of the user's limb relative to the user's view 405. Moreover, the POV message controller identifies a preferred hand 420 of the user and determines the hand location 415 of the preferred hand. In the depicted example, the preferred hand 420 is located within the user's view 405. In some embodiments, the hand location 415 corresponds to a set of spatial coordinates. Using the set of spatial coordinates, the POV message controller determines a placement location for the first message 430. Here, the first message 430 is positioned near the hand location 415, beneficially within easy reach of the preferred hand 420. In various embodiments, the placement location may be a predetermined distance from the hand location 415.

While depicted as a floating message, in other embodiments the POV message controller may place the first message on a surface near the hand location 415. Here, a flat object or surface in the user's view 405 (such as a flat surface of the vehicle interior 410) may be selected as the message location, wherein the POV message controller may project the first message 430 onto the flat object or other surface. For example, a dashboard surface of the vehicle may become a virtual display by the POV message controller placing the first message 430 onto the dashboard surface.

Note that the non-preferred hand 425 (a left hand) is also within the user's view 405. Here, the non-preferred hand 425 is depicted as touching (or placed near) a steering wheel. In certain embodiments, the right hand is set as the preferred hand 420 in the scenario 400 due to the POV message controller determining that the left hand is occupied (e.g., with the steering wheel). In other embodiments, the right hand is set as the preferred hand 420 by user preference or due to the user historically using the right hand to response to messages.

Figure 4B:
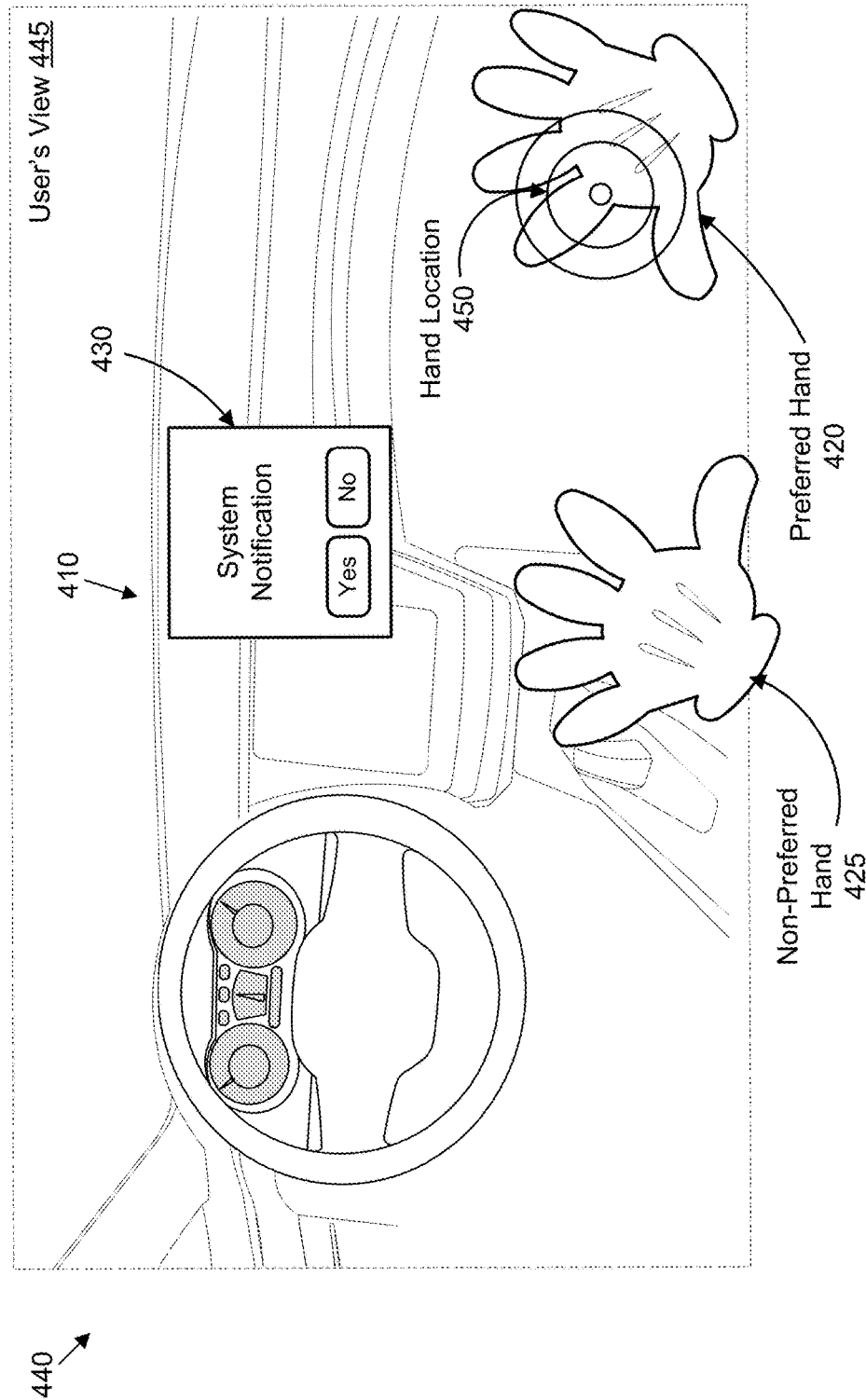
FIG. 4B is a diagram illustrating one embodiment of displaying a message at a default location.

FIG. 4B depicts one scenario 440 of displaying a message at a default location, according to embodiments of the disclosure. FIG. 4B depicts a user's view 445, which may be one embodiment of the user's field of view 120. Here, the user's view 445 is from a passenger's seat of a vehicle. Moreover, the user's view 445 includes one or more objects and/or scenes, such as a vehicle interior 410. In one embodiment, the objects/scenes are a part of the real world, for example as viewed through an augmented reality display. In another embodiment, the objects/scenes are virtual, for example, computer-generated images in the augmented reality display or objects of a virtual world viewed through a virtual reality display. A POV message controller (e.g., embodied in the electronic device 105, the POV display device 200, the message controller 225, and/or the display controller 300, described above) again receives a notification, text message, or the like and determines to present a first message 430 within the user's view 445.

In the scenario 440, the POV message controller determines, for example based on context in the user's view 445, that it does not need to place the first message 430 next to the user's preferred hand. While in some embodiments the POV message controller still selects a message placement location near the hand location 450, in the depicted embodiment the POV message controller places the first message 430 in a central area of the user's view 445 (e.g., a central area of the VR display or AR display).

Figure 5A:
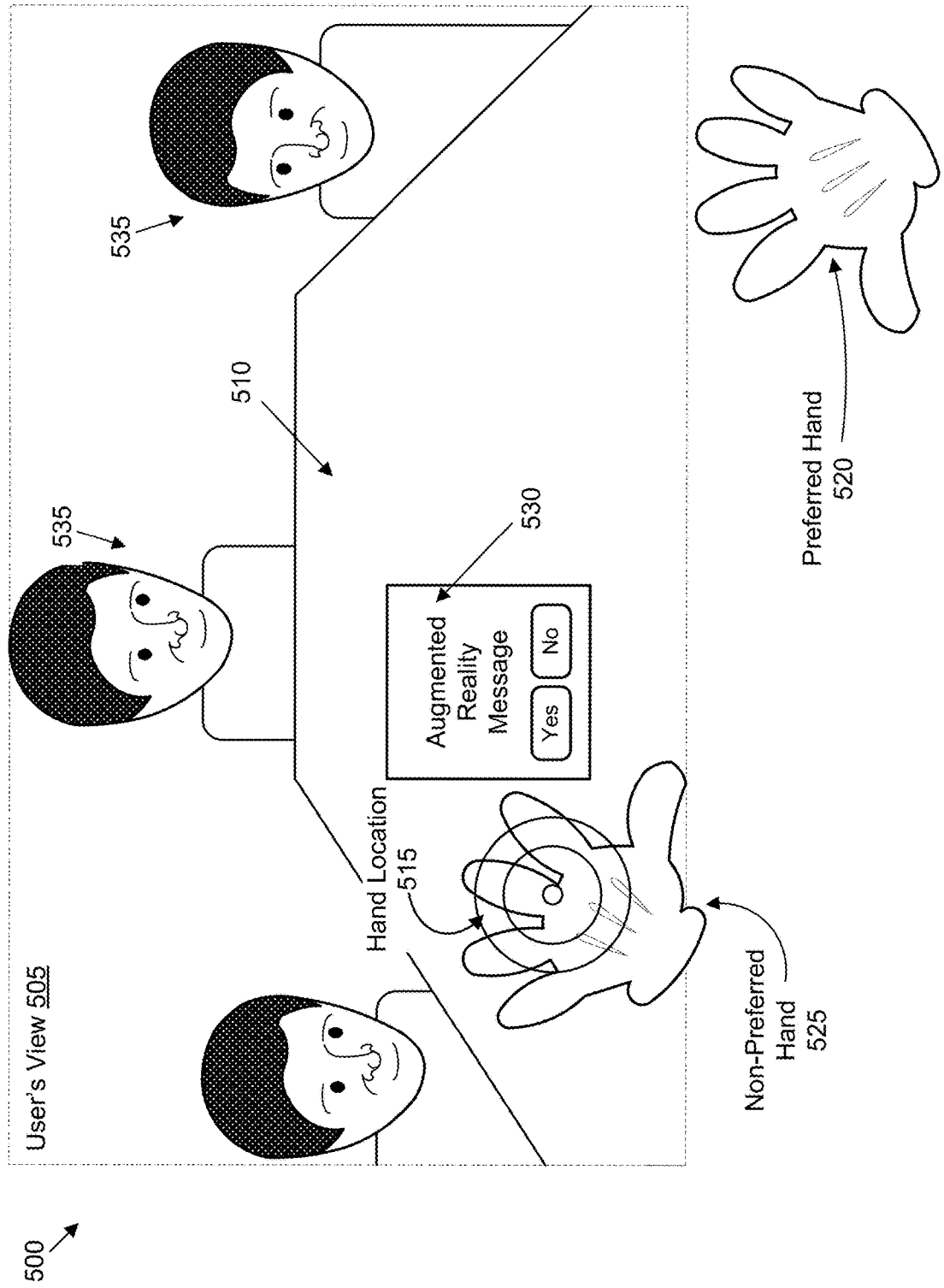
FIG. 5A is a diagram illustrating one embodiment of displaying a message at a second location.

FIG. 5A depicts a first scenario 500 of displaying a message at a second location, according to embodiments of the disclosure. FIG. 5A depicts a user's view 505, which may be one embodiment of the user's field of view 120. Here, the user's view 505 is a seat at a table, for example in a conference room. Moreover, the user's view 505 includes one or more objects and/or scenes, such as a table 510. In one embodiment, the objects/scenes are a part of the real world, for example as viewed through an augmented reality display. In another embodiment, the objects/scenes are virtual, for example, computer-generated images in the augmented reality display or objects of a virtual world viewed through a virtual reality display. A POV message controller (e.g., embodied in the electronic device 105, the POV display device 200, the message controller 225, and/or the display controller 300, described above) receives a notification, text message, or the like and determines to present a first message 530 within the user's view 505.

In response to determining to present the first message 530, the POV message controller determines a message location for placing the first message 530 by determining a location of the user's limb relative to the user's view 505. Moreover, the POV message controller identifies a preferred hand 520 of the user.

Because the preferred hand 520 is located outside the user's view 505, the POV message controller determines to place the message 530 at a secondary location. In the depicted example, the non-preferred hand 525 is located within the user's view 505. Accordingly, the POV message controller identifies a hand location 515 of the non-preferred hand 525. In some embodiments, the hand location 515 corresponds to a set of spatial coordinates. Using the set of spatial coordinates, the POV message controller determines a placement location for the first message 530.

In the depicted embodiment, the first message 530 is positioned near the hand location 515, beneficially within easy reach of the non-preferred hand 525. In various embodiments, the placement location may be a predetermined distance from the hand location 515. In certain embodiments, the user's right hand is set as the preferred hand 520 in the scenario 500 by user input/preference. In other embodiments, the right hand is set as the preferred hand 420 or due to the user historically using the right hand to response to messages.

In the scenario 500, the POV message controller may determine, for example based on context in the user's view 505, that it should place the first message 530 next to the user's hand (here, the non-preferred hand 525). For example, due to the presence of individuals 535 in the user's view 505, the POV message controller may determine that it should operate in a stealth mode to minimize the likelihood of the user's use of the POV display device being noticed by the individuals 535.

Figure 5B:
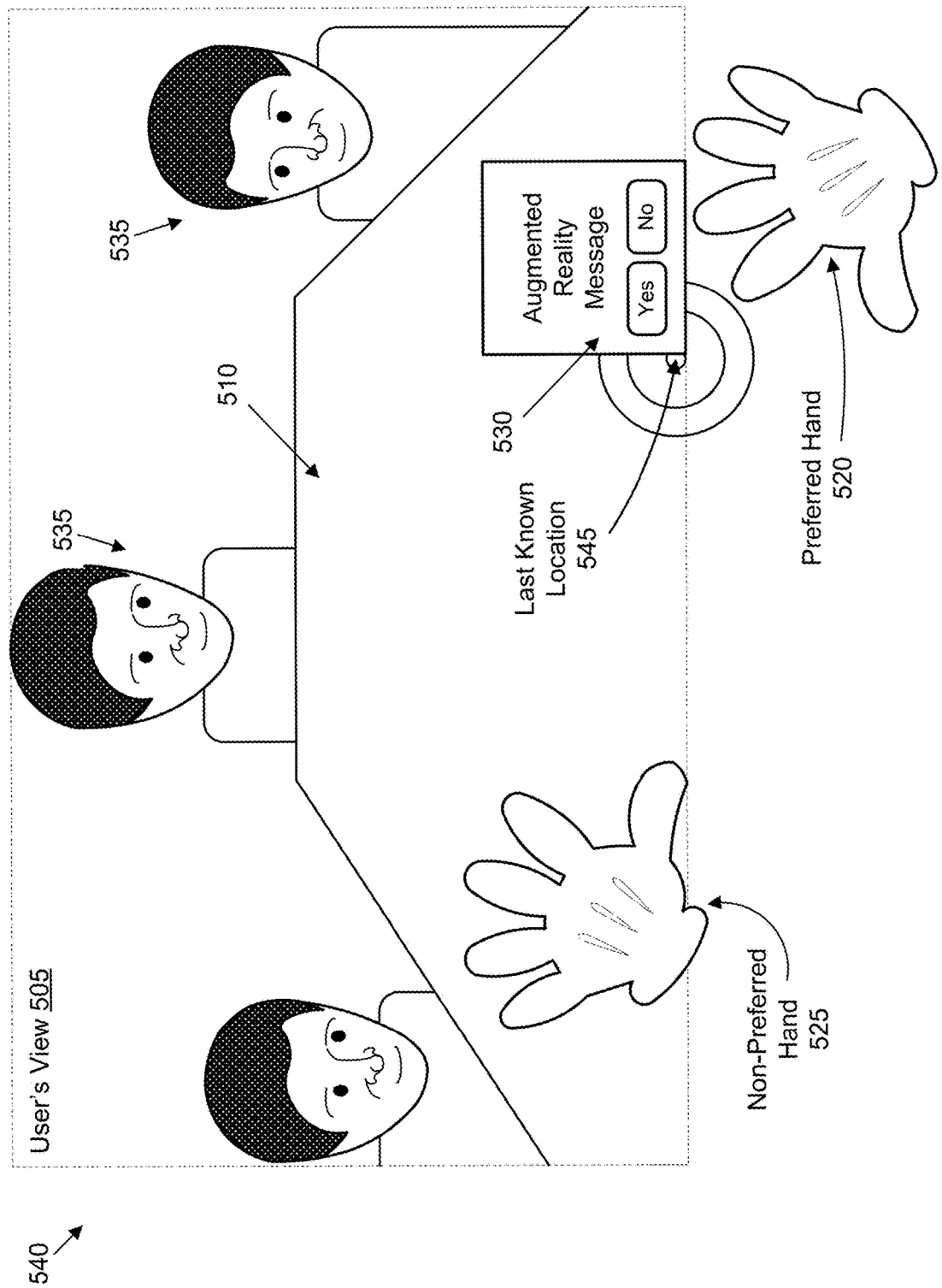
FIG. 5B is a diagram illustrating another embodiment of displaying a message at a second location.

FIG. 5B depicts a second scenario 540 of displaying a message at a second location, according to embodiments of the disclosure. Here, a POV message controller (e.g., embodied in the electronic device 105, the POV display device 200, the message controller 225, and/or the display controller 300, described above) receives a notification, text message, or the like and determines to present a first message 530 within the user's view 505. In response to determining to present the first message 530, the POV message controller determines a message location for placing the first message 530 by determining a location of the user's limb relative to the user's view 505.

In certain embodiments, the POV message controller identifies a preferred hand 520 of the user. However, in the depicted example, the preferred hand 520 is located outside the user's view 505. Accordingly, the POV message controller determines a last known location 545 of the preferred hand 520. Here, the last known location 545 is a set of spatial coordinates along a periphery of the user's view 505. Using the set of spatial coordinates, the POV message controller determines a placement location for the first message 530. Here, the first message 530 is positioned along the periphery of the display near the last known location 545.

Note that the non-preferred hand 525 (a left hand) is also within the user's view 505. However, the POV message controller ignores the non-preferred hand 525, instead placing the first message near a last known position of the preferred hand (a right hand), for example due to stored user preferences.

Figure 5C:
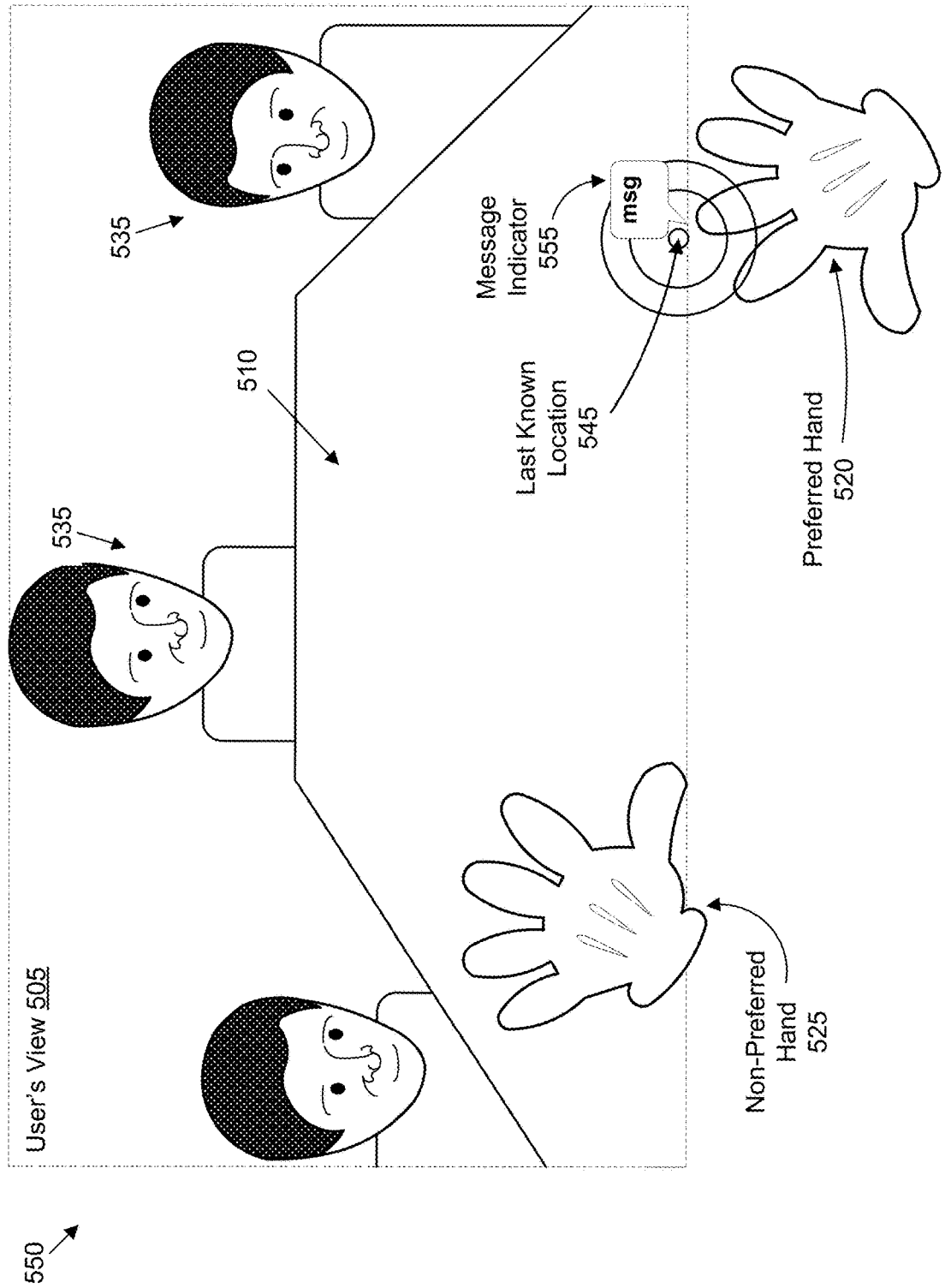
FIG. 5C is a diagram illustrating one embodiment of displaying a message indicator at a second location.

FIG. 5C depicts one scenario 550 of displaying a message indicator 555 at a second location, according to embodiments of the disclosure. Here, a POV message controller (e.g., embodied in the electronic device 105, the POV display device 200, the message controller 225, and/or the display controller 300, described above) receives a notification, text message, or the like for presenting within the user's view 505. In response to receiving the message/notification, the POV message controller determines a message placement location by determining a location of the user's limb relative to the user's view 505.

In certain embodiments, the POV message controller identifies a preferred hand 520 of the user. However, in the depicted example, the preferred hand 520 is located outside the user's view 505. Accordingly, the POV message controller determines a last known location 545 of the preferred hand 520. Here, the last known location 545 is a set of spatial coordinates along a periphery of the user's view 505. Using the set of spatial coordinates, the POV message controller determines a message placement location. However, because the preferred hand 520 is not within he user's view 505, the POV message controller displays a message indicator 555 at a location of the display near the last known location 545.

Moreover, the POV message controller may monitor for the preferred hand 520. In response to the user moving the preferred hand 520 into the user's view 505 and/or moving the user's view 505 to the location of the preferred hand (e.g., looking down the preferred hand 520), the POV message controller may replace the message indicator 555 with a message window containing the received message/notification, for example displaying the first message 530.

Figure 6:
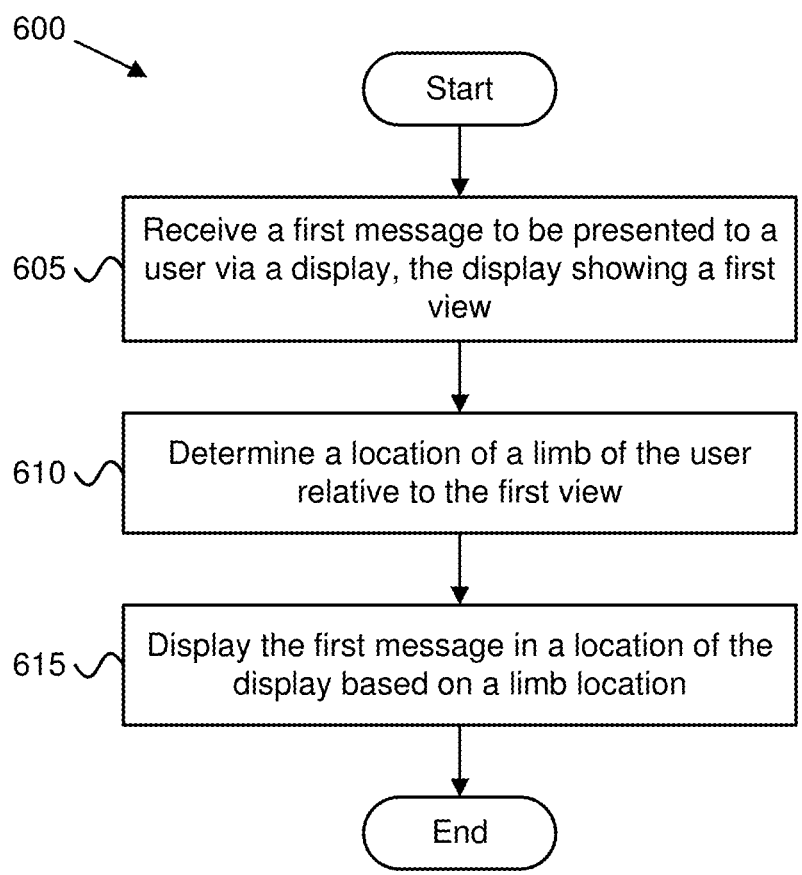
FIG. 6 is a flowchart diagram illustrating one embodiment of a method 600 for presenting a message in a location of a view selected based on a location of a user's limb relative to the view.

FIG. 6 depicts a method 600 for presenting a message in a location of a view selected based on a location of a user's limb relative to the view, according to embodiments of the disclosure. In some embodiments, the method 600 is performed using a POV message controller, for example, embodied in the electronic device 105, the POV display device 200, the message controller 225, and/or the display controller 300, described above. In some embodiments, the method 600 is performed by a processor, such as a microcontroller, a microprocessor, a central processing unit (CPU), a graphics processing unit (GPU), an auxiliary processing unit, a FPGA, or the like.

The method 600 begins with receiving 605 a first message to be presented to a user via a display (e.g., via the POV display). Here, the display shows a first view. The first view may be one of an augmented reality view and a virtual reality view. Moreover, image data corresponding to the first view is presented on the display. In various embodiments, the first message is one or more of: a text message, a system notification, a prompt, a pop-up, an alert, and the like.

In various embodiments, the first message may be received from an operating system of the POV display, an application in communication with the POV display, a correspondent of the user, and the like. Moreover, the first message may include one or more selectable elements. Examples of selectable elements include, but are not limited to, an acknowledgement element, a reply button, a send button, a virtual keyboard, a file link, a hyperlink, and the like.

The method 600 includes determining 610 a location of a limb of the user relative to the first view. In some embodiments, determining 610 a location of a limb of the user relative to the first view includes receiving image data from a camera, the image data corresponding to the first view, and determining whether the limb is included in the captured image data. If the limb is present in the captured image data, then spatial coordinates of the limb may be identified. In certain embodiments, if the limb is not present in the captured image data, then a last known location of the limb, or an expected location may be identified. In other embodiments, the location of a limb not within the first view may be tracked, for example using one or more additional cameras, inertial measurement data, etc. In certain embodiments, determining 610 whether a limb of the user is within a first view includes identifying a preferred hand of the user and determining whether the preferred hand is within the first view.

The method 600 includes displaying 615 the first message in a location of the display based on the limb location. For example, if the limb is within the first view, then displaying 615 the first message includes displaying the first message at a first location. Here, the first location may be, for example, a location near the user's preferred hand. In some embodiments, the first location is no more than a predetermined distance away from the user's preferred hand. As another example, if the limb is not within the first view, then displaying 615 the first message includes displaying the first message at a second location. Here, the second location may be along a periphery of the display, for example at a location based on an expected or last known limb location. Alternatively, the second location may be a location near a non-preferred limb of the user. The method 600 ends.

Figure 7:
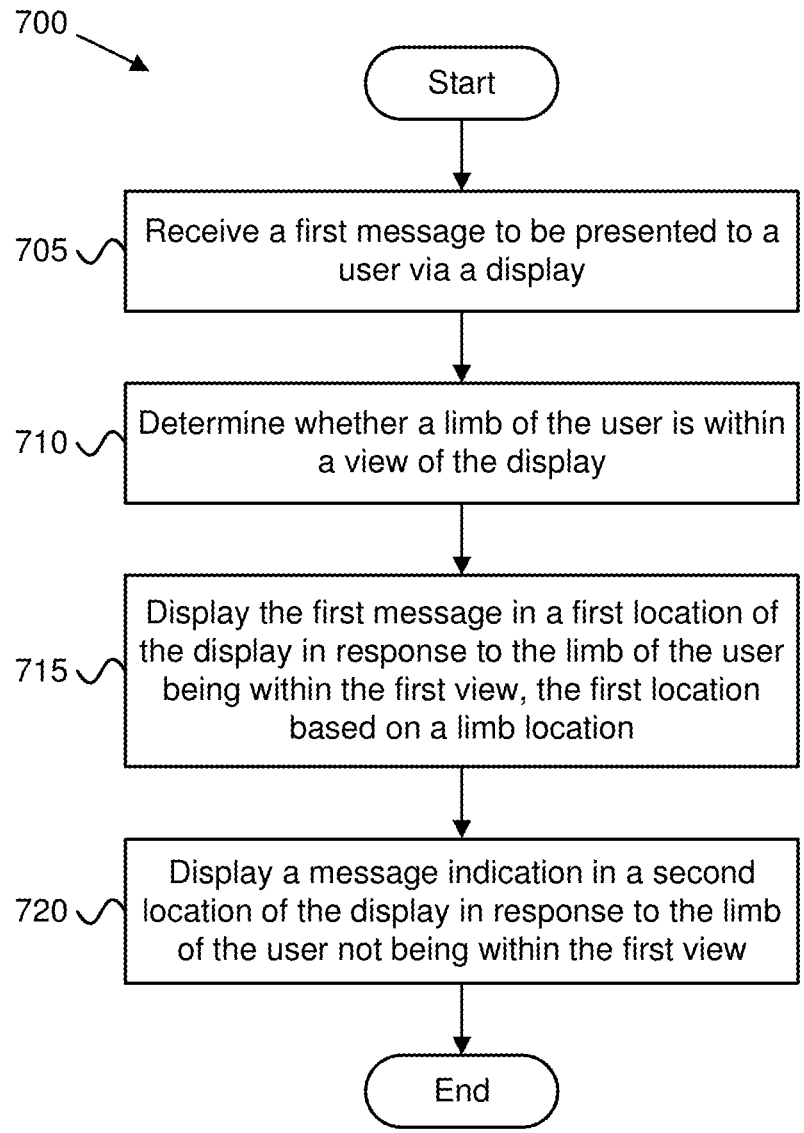
FIG. 7 is a flowchart diagram illustrating another embodiment of a method 700 for presenting a message in a location of a view selected based on a location of a user's limb relative to the view.

FIG. 7 depicts a method 700 for presenting a message in a location of a view selected based on a location of a user's limb relative to the view, according to embodiments of the disclosure. In some embodiments, the method 700 is performed using a POV message controller, for example embodied in the electronic device 105, the POV display device 200, the message controller 225, and/or the display controller 300, described above. In some embodiments, the method 700 is performed by a processor, such as a microcontroller, a microprocessor, a central processing unit (CPU), a graphics processing unit (GPU), an auxiliary processing unit, a FPGA, or the like.

The method 700 begins with receiving 705 a first message to be presented to a user via a display (e.g., via the POV display). In various embodiments, the first message is one or more of: a text message, a system notification, a prompt, a pop-up, an alert, and the like. Here, the first message may be received from an operating system of the POV display, an application in communication with the POV display, a correspondent of the user, and the like. Moreover, the first message may include one or more selectable elements. Examples of selectable elements include, but are not limited to, an acknowledgement element, a reply button, a send button, a virtual keyboard, a file link, a hyperlink, and the like.

The method 700 includes determining 710 whether a limb of the user is within a first view. Here, the first view is one of an augmented reality view and a virtual reality view. Moreover, image data corresponding to the first view is presented on the display.

In some embodiments, determining 710 whether a limb of the user is within a first view includes receiving image data from a camera, the image data corresponding to the first view, and determining whether the limb of the user is included in the captured image data. In certain embodiments, determining 710 whether a limb of the user is within a first view includes identifying a preferred hand of the user and determining whether the preferred hand is within the first view.

The method 700 includes displaying 715 the first message in a first location of the display in response to the limb of the user being within the first view. Here, the first location is based on a limb location, for example, the location of the user's preferred hand. In some embodiments, the first location is no more than a predetermined distance away from the user's preferred hand.

The method 700 includes displaying 720 a message indication in a second location of the display in response to the limb of the user not being within the first view. In various embodiments, the second location may be based on a last known limb location, and expected them location, a location of a non-preferred hand, and/or along the periphery of the POV display. The method 700 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a display that presents a first view;
   a processor; and
   a memory that stores code executable by the processor to:
   receive a first message to be presented to a user within the first view;
   determine a location of a limb of the user relative to the first view, wherein the limb is a preferred hand of the user; and
   present the first message in a location of the first view based on the limb location,
      wherein the first message is displayed within a predetermined distance of the preferred hand in response to the to the preferred hand being within the first view, and
      wherein the first message is displayed near a non-preferred hand of the user in response to the preferred hand not being within the first view.

2. The apparatus of claim 1, wherein the first view is an augmented reality view, the apparatus further comprising a camera that captures image data corresponding to the first view, wherein the processor determines whether the preferred hand of the user is within the first view using the captured image data.

3. The apparatus of claim 1, wherein the processor presents image data corresponding to the first view on the display, wherein the processor presents the first message along a periphery of the first view in response to the limb of the user not being within the first view.

4. The apparatus of claim 1, wherein the first message comprises one or more selection elements, said selection elements comprising one or more of: an acknowledgement element, a reply button, a send button, and a virtual keyboard.

5. The apparatus of claim 1, wherein the processor determines whether the apparatus is operating in a stealth mode, wherein determining the location of a limb of the user relative to the first view occurs in response to determining that the apparatus is operating in a stealth mode, wherein the processor further presents the first message in a central area of the first view in response to determining that the apparatus is not operating in a stealth mode.

6. The apparatus of claim 1, wherein the processor identifies a surface near the limb location, wherein presenting the first message comprises overlaying the first message on the identified surface.

7. A method comprising:
   receiving, by use of a processor, a first message to be presented to a user via a display, the display showing a first view;
   determining a location of a limb of the user relative to the first view, the first view being one of a virtual reality view and an augmented reality view; and
   displaying the first message in a location of the first view based on the limb location, wherein displaying the first message in the location of the first view based on the limb location comprises displaying the first message along a periphery of the display in response to the limb of the user not being within the first view.

8. The method of claim 7, further comprising:
   determining whether a limb of the user is within the first view, the limb being one of: a preferred hand of the user and a non-preferred hand of the user;
   displaying the first message in a first location in response to the preferred hand of the user being within the first view; and
   displaying the first message in a second location in response to the preferred hand of the user not being within the first view and the non-preferred hand of the user being with the first view,
   wherein the first location is within a predetermined distance of the preferred hand, and wherein the second location is within a predetermined distance of the non-dominant hand.

9. The method of claim 8, wherein the first view is an augmented reality view, the method further comprising:
   capturing image data corresponding to the first view, wherein determining whether a limb of the user is within the first view comprises determining whether a limb of the user is within the captured image data.

10. The method of claim 7, further comprising displaying image data corresponding to the first view on the display.

11. The method of claim 7, wherein the first message comprises one or more selection elements, said selection elements comprising one or more of: an acknowledgement element, a reply button, a send button, and a virtual keyboard.

12. The method of claim 7, further comprising:
    determining whether the display is operating in a stealth mode, wherein determining the location of a limb of the user relative to the first view occurs in response to determining that the display is operating in a stealth mode; and displaying the first message in a central area of the display in response to determining that the display is not operating in a stealth mode.

13. The method of claim 7, further comprising: identifying a surface near the limb location, wherein presenting the first message comprises overlaying the first message on the identified surface.

14. The method of claim 7, wherein displaying the first message along a periphery of the display comprises displaying the first message at a location along the periphery based on one of a last known limb location and an expected limb location.

15. A program product comprising a computer readable storage medium that stores code executable by a processor, the executable code comprising code that:

receives a first message to be presented to a user via an augmented reality display, the augmented reality display showing a first view;

determines whether a limb of the user is within the first view;

displays the first message in a first location of the augmented reality display in response to the limb of the user being within the first view, the first location based on a limb location; and displays a message indication in a second location of the augmented reality display in response to the limb of the user not being within the first view, wherein the second location is along a periphery of the first view.

16. The program product of claim 15, further comprising code that:

identifies a limb location in response to the limb of the user being within the first view, wherein displaying the first message in a first location of the augmented reality display based on the limb location comprises identifying a surface near the limb location and displaying the first message on the identified surface.

17. The program product of claim 15, wherein the first message comprises one or more of: an acknowledgement element, a reply button, a send button, and a virtual keyboard.

18. The program product of claim 15, wherein the second location is based on a last known limb location, the program product further comprising code that:

determines that the limb is within the first view after displaying the message indication;

identifies a current limb location in response to the limb of the user being within the first view; and displays the first message in a location of the augmented reality display based on the current limb location.

19. The program product of claim 15, wherein the second location is based on one of a last known limb location and an expected limb location.

20. The program product of claim 15, further comprising:

determining whether a limb of the user is within the first view, the limb being one of: a preferred hand of the user and a non-preferred hand of the user;

displaying the first message in a first location in response to the preferred hand of the user being within the first view; and displaying the first message in a third location in response to the preferred hand of the user not being within the first view and the non-preferred hand of the user being with the first view, wherein the first location is within a predetermined distance of the preferred hand, and wherein the third location is within a predetermined distance of the non-preferred hand of the user.

* * * * *